(12) United States Patent
Hartzog

(10) Patent No.: US 8,129,945 B2
(45) Date of Patent: Mar. 6, 2012

(54) SYSTEM AND METHOD FOR BALANCING A STATE OF CHARGE OF SERIES CONNECTED CELLS

(75) Inventor: Chad Hartzog, Kokomo, IN (US)

(73) Assignee: Enerdel, Inc., Indianapolis, IN (US)

( * ) Notice: Subject to any disclaimer, the term of this patent is extended or adjusted under 35 U.S.C. 154(b) by 901 days.

(21) Appl. No.: 12/051,921

(22) Filed: Mar. 20, 2008

(65) Prior Publication Data

US 2008/0231231 A1  Sep. 25, 2008

Related U.S. Application Data

(60) Provisional application No. 60/895,768, filed on Mar. 20, 2007.

(51) Int. Cl.
*H02J 7/00* (2006.01)

(52) U.S. Cl. ........................ 320/118; 320/119

(58) Field of Classification Search ........... 320/118–119
See application file for complete search history.

(56) References Cited

U.S. PATENT DOCUMENTS

| 5,631,534 | A | 5/1997 | Lewis |
| 6,064,178 | A | 5/2000 | Miller |
| 6,297,617 | B1 * | 10/2001 | Aoyama ................... 320/128 |
| 7,126,312 | B2 | 10/2006 | Moore |
| 2004/0135545 | A1 | 7/2004 | Fowler et al. |
| 2005/0275372 | A1 | 12/2005 | Crowell |

OTHER PUBLICATIONS

Moore, Stephen W., "A Review of Cell Equalization Methods for Litium Ion and Lithium Polymer Battery Systems," 2001 Society of Automotive Engineers, Inc.
PCT/US 08/03649 International Search Report dated Jun. 20, 2008.

* cited by examiner

*Primary Examiner* — Samuel Berhanu
(74) *Attorney, Agent, or Firm* — Ice Miller LLP

(57) ABSTRACT

A system and method for charging an undercharged cell of a bank of series connected cells utilizes a charging circuit. The charging circuit includes an inductor that receives current from the entire bank of cells and then provides current to the undercharged cell. Pulse width modulation is utilized to turn the switches on and off to regulate the current that flows to the inductor and thus is provided to the undercharged cell.

20 Claims, 3 Drawing Sheets

SYSTEM AND METHOD FOR BALANCING A STATE OF CHARGE OF SERIES CONNECTED CELLS

CROSS REFERENCE TO RELATED APPLICATION

This application claims the benefit of U.S. Provisional Application No. 60/895,768 filed Mar. 20, 2007, which is incorporated by reference.

BACKGROUND OF THE INVENTION

1. Field of the Invention

The subject invention relates generally to a system and method of balancing a state of charge (SOC) of a plurality of cells connected in series.

2. Description of the Related Art

Electric vehicles and hybrid-electric vehicles typically utilize numerous cells (i.e., batteries) for powering electric loads such as drive motors and other electric equipment. These cells are often connected together in a series relationship, as is well known to those skilled in the art, to provide higher voltages.

Due to variations between individual cells, such series-connected cells require periodic balancing, i.e., charge equalization, to maintain a steady voltage. prevent premature failure, and provide maximum power to the load. Various systems and techniques have been developed to address this necessity. For example, active cell balancing methods include charge shunting, where current is shunted around fully charged cells; charge shuttling, where charge is removed from one cell and delivered to another cell; energy converters, where inductors or transformers move energy from a cell or group of cells to another cell or group of cells; and energy dissipation, where charge is removed from the cells with the highest charge.

Particularly, the use of energy converters, such as inductive charge shuttling, to shuttle current between individual cells is commonly used. However, inductive charge shuttling techniques are typically "open loop" techniques, i.e., the current delivered to the cell to be charged is based on the tolerance of the inductor and generally not variable.

As it as advantageous to vary the amount of current provided to the cell based on the current charge of the cell, there remains an opportunity for a method and system for balancing a state of charge of a cell based on the current charge of the cell.

SUMMARY OF THE INVENTION AND ADVANTAGES

The subject invention includes a system for balancing a state of charge (SOC) of a plurality of cells connected in series. The system includes a positive bus and a negative bus. The system also includes a plurality of positive bus switches with each positive bus switch electrically connected to the positive bus and to one of the cells for electrically connecting the positive bus to a positive side of the one of the cells. The system further includes a plurality of negative bus switches with each negative bus switch electrically connected to the negative bus and to one of the cells for electrically connecting the negative bus to a negative side of the one of the cells. A charging circuit is electrically connected to a voltage source and the busses for charging an undercharged cell of the plurality of cells. The charging circuit includes an inductor having a first side electrically connected to the negative bus and a second side electrically connected to the positive bus. A first switch is electrically connected to the first side of the inductor and a positive terminal of a voltage source. A second switch is electrically connected to the second side of the inductor and a negative terminal of the voltage source. The system also includes a controller in communication with the first and second switches for activating the first and second switches to transfer energy from the voltage source to the inductor and deactivating the first and second switches to transfer energy from the inductor to the undercharged cell of the plurality of cells.

The subject invention also provides a method of balancing a state of charge (SOC) of a plurality of cells connected in series. The method includes the step of identifying an undercharged cell from the plurality of cells to charge. The method also includes the steps of electrically connecting a positive side of the undercharged cell to a positive bus and electrically connecting a negative side of the undercharged cell to a negative bus. An inductor is electrically connected to a voltage source during a first time period. The inductor is electrically disconnected from the voltage source in response to an elapse of the first time period. The method also includes the step of maintaining the disconnection of the inductor from the plurality of cells for a second time period corresponding generally to the time for the inductor to discharge energy to the undercharged cell.

By selectively connecting and disconnecting the inductor from the voltage source, the system and method of the subject invention provides a controlled amount of current to charge the undercharged cell. This controlled amount of current may be varied based on the amount of charge on the undercharged cell. Accordingly, the speed at which the undercharged cell is charged is increased over that of the prior art. Furthermore, the system and method of the subject invention does not waste energy that occurs in charge shunting or energy dissipation techniques.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, a system 10 and method 100 for balancing a state of charge (SOC) in a plurality of cells 12 connected in series is shown. Those skilled in the art realize that a "cell" is commonly referred to as a "battery". However, for purposes of consistency, the term cell 12 shall be used throughout and should not be regarded as limiting in any way.

Figure 1:
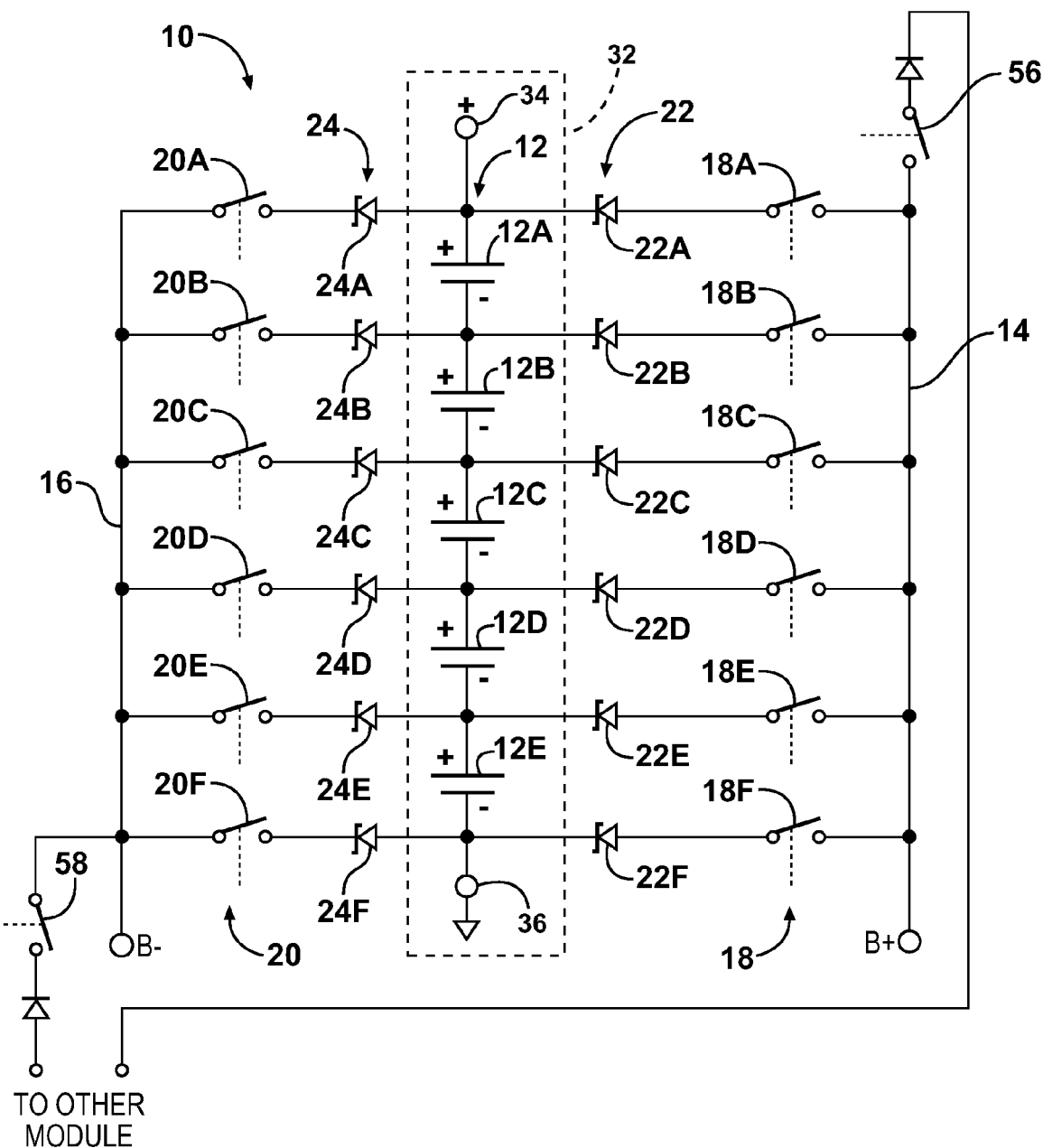
FIG. 1 is a block electrical schematic diagram of the system showing a plurality of cells, a positive bus, a negative bus, a plurality of bus switches, and a plurality of bus diodes.
Figure 2:
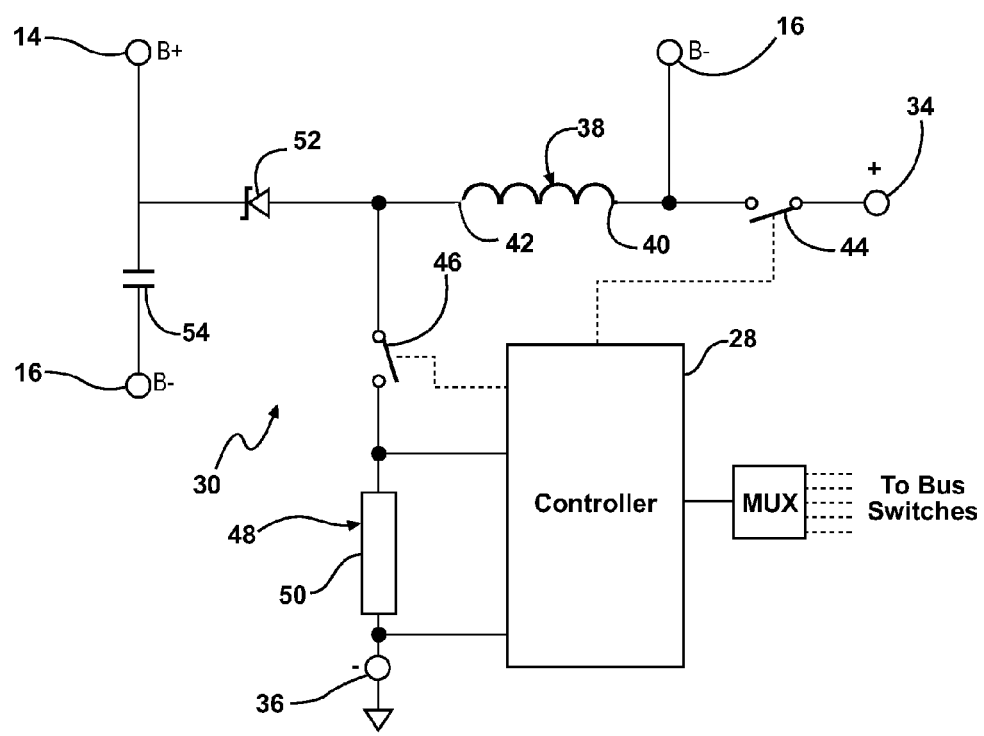
FIG. 2 is a block electrical schematic diagram of the system showing a controller and a charging circuit.
Figure 3:
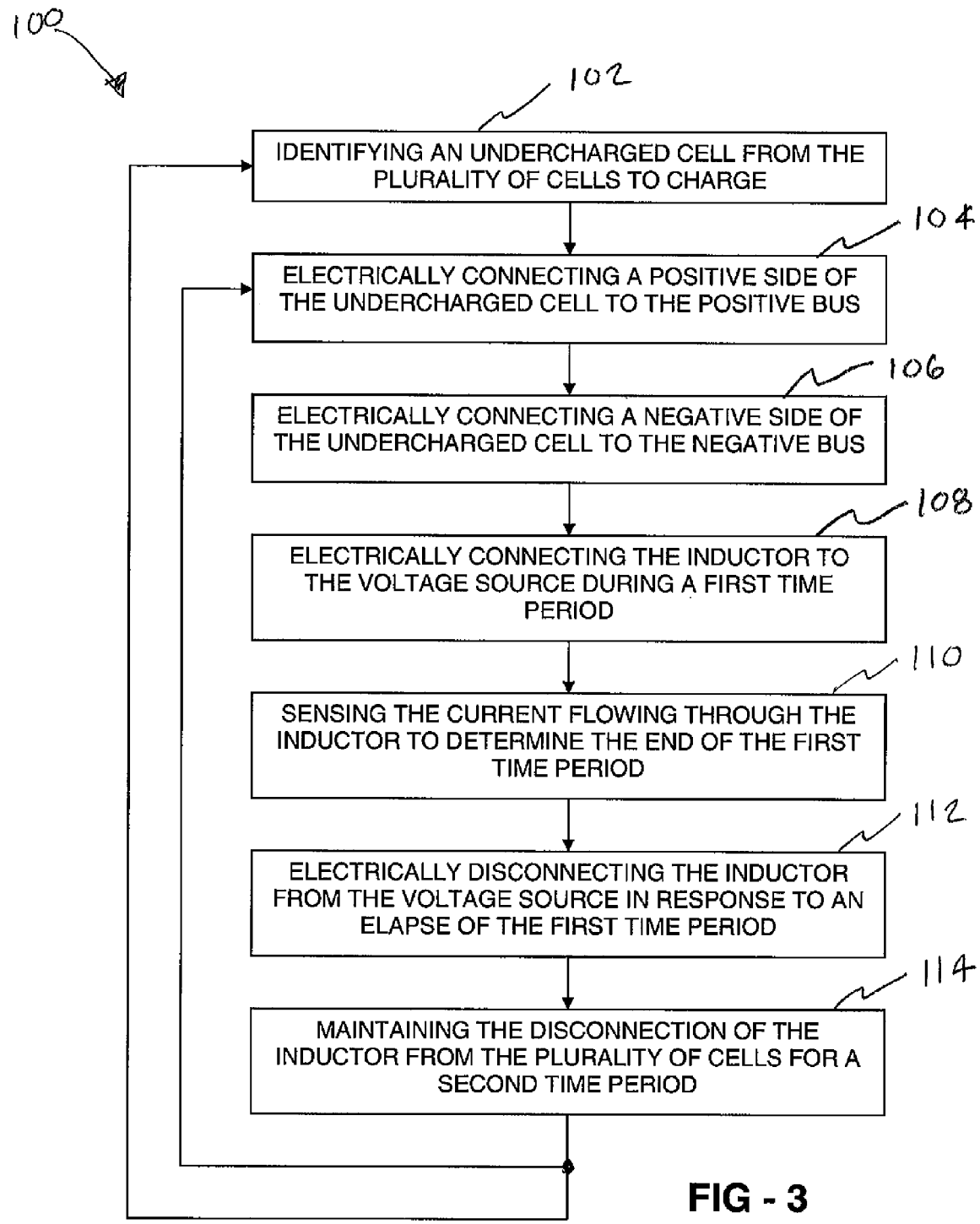
FIG. 3 is a flowchart diagram showing a method of the subject invention.

Each cell 12 includes a positive side (i.e., a cathode) and a negative side (i.e., an anode) as is known to those skilled in the art. Referring to FIG. 1, the plurality of cells 12 are electrically connected together in series. That is, the negative side of a first cell 12A is electrically connected to the positive side of a second cell 12B, the negative side of the second cell 12B is electrically connected to the positive side of a third cell 12C, and so on. Furthermore, each cell 12 may actually be multiple physical cells 12 connected in series and/or parallel. The cells 12 may be implemented in a vehicle (not shown), such as an electrically driven vehicle or a hybrid-electric vehicle. However, those skilled in the art realize that the cells 12 may be implemented in other environments including non-vehicle applications.

In the illustrated embodiments of the invention, five cells 12 are connected in series, and labeled sequentially from the first cell 12A through a fifth cell 12E. Of course, any number, type, or capacity of cells 12 may be utilized with the subject invention, and the use of five cells 12 in the illustrated embodiment should not be regarded as limiting. The system 10 may include one or more voltage sensors (not shown) electrically connected to the cells 12 for sensing the voltage of each cell 12. Alternatively, the voltage sensors may be a part of an external device (not shown) that is in communication with the system 10 of the illustrated embodiment.

In the illustrated embodiment, the system 10 includes a positive bus 14 and a negative bus 16. A plurality of positive bus switches 18 are electrically connected to the positive bus 14 and plurality of negative bus switches 20 are electrically connected to the negative bus 16. Accordingly, the positive bus 14 may be implemented as the electrical connections between the positive bus switches 18 and the negative bus 16 may be implemented as the electrical connections between the negative bus switches 20.

The bus switches 18, 20 serve to electrically connect the busses 14, 16 to the cells. Specifically, in the illustrated embodiments, each positive bus switch 18 electrically connects the positive bus 14 to a positive side of one of the cells 12 and each negative bus switch 20 electrically connects the negative bus 16 to a negative side of one of the cells 12.

The bus switches 18, 20 are shown in FIG. 1 with a generic electrical switch symbol. Preferably, the bus switches 18, 20 are implemented with transistors, such as metal-oxide-semiconductor field-effect transistors (MOSFETs). Of course, other alternative techniques for implementing the bus switches 18, 20 are realized by those skilled in the art, such as, but not limited to, mechanical-type switches.

In the illustrated embodiment, the system 10 also includes a plurality of positive bus diodes 22 and a plurality of negative bus diodes 24. Each positive bus diode 22 is electrically connected between each positive bus switch 18 and each cell 12 to allow current flow from the positive bus 14 to the cell 12. Each negative bus diode 24 is electrically connected between each negative bus switch 20 and each cell 12 to allow current flow from the cell 12 to the negative bus 16. For purposes of illustration, the positive bus switches 18 are labeled sequentially from a first positive bus switch 18A through a sixth positive bus switch 18F and the negative bus switches 20 are labeled sequentially from a first negative bus switch 20A through a sixth negative bus switch 20F. The positive bus diodes 22 are labeled sequentially from a first positive bus diode 22A to a sixth positive bus diode 22F and the negative bus diodes 24 are labeled sequentially from a first negative bus diode 24A to a sixth negative bus diode 24F. In FIG. 1, the bus diodes 22, 24 are shown as Zener diodes. However, other suitable diode types may also be acceptable.

In an alternative embodiment (not shown), the system 10 includes a plurality of field-effect transistors (FETs) (not shown) instead of the diodes 22, 24 of the illustrated embodiment. Specifically, the FETs are electrically connected between each bus switch 18, 20 and each cell 12. This alternative embodiment configuration allows bidirectional flow of current between the cells 12 and the busses 14, 16. This allows the shuttling of current between the cells 12. Preferably, the FETs are high-speed FETs, which are well known by those skilled in the art.

The system 10 of the illustrated embodiment also includes a controller 28 for controlling the SOC balancing, i.e., the charging and discharging, of the cells 12. The controller 28 may be implemented with multiple electronic devices or may be packaged in one microchip, as is well known to those skilled in the art.

The system 10 also includes a charging circuit 30. The charging circuit 30 facilitates the charging of the various cells 12. The charging circuit 30 is electrically connected to a voltage source 32 for receiving electric current. The voltage source 32 includes a positive terminal 34 and a negative terminal 36. In the illustrated embodiments, the series-connected cells 12 act as the voltage source 32. However, in other embodiments, the voltage source 32 may be an external source (not shown) such as other battery packs or power supplies. The charging circuit 30 is also electrically connected to the busses 14, 16. The charging circuit 30 supplies electric current to the busses 14, 16 for charging an undercharged cell 12, as described in detail below.

The charging circuit 30 includes an inductor 38 having a first side 40 and a second side 42. The first side 40 is electrically connected to the negative bus 16 and the second side 42 is electrically connected to the positive bus 14. The inductor 38 may be implemented as a pair of inductors connected in series. One suitable inductor 38 has an inductance of about 47 uH, such as the DR125-470 manufactured by Cooper-Bussman.

The charging circuit 30 also includes a first switch 44 and a second switch 46. The first switch 44 is electrically connected between the first side 40 of the inductor 38 and the positive terminal 34 of the voltage source 32. As such, the first switch 44 electrically connects and disconnects the inductor 38 from the voltage source 32. The second switch 46 is electrically connected between the second side 42 of the inductor 38 and the negative terminal 36 of the voltage source 32. Accordingly, the second switch 36 also electrically connects and disconnects the inductor 38 from the voltage source 32. The controller 28 is in communication with the first and second switches 44, 46 for activating the first and second switches 44, 46 to transfer energy from the voltage source 32 to the inductor 38 The controller 28 also controls deactivation of the first and second switches 44, 46 to transfer energy from the inductor 38 to the undercharged cell 12 of the plurality of cells 12, as is further described below.

Preferably, the first and second switches 44, 46 are implemented with transistors, such as MOSFETs having a gate, a source, and a drain. With respect to the first switch 44, the gate is electrically connected to the controller 28, the source is electrically connected to the positive terminal 34 of the voltage source 32, and the drain is electrically connected to the first side 40 of the inductor 38. With respect to the second switch 46, the gate is electrically connected to the controller 28, the source is electrically connected to the second side 42 of the inductor 38, and the drain is electrically connected to the negative terminal 36 of the voltage source 32.

The charging circuit 30 further includes a current sensor 48 electrically connected between the second switch 46 and the negative terminal 36 of the voltage source 32. The current sensor 48 is in communication with the controller 28 for sensing an amount of current flowing through the inductor 38. As such, the amount of current that is to be delivered to the undercharged cell 12 may be regulated.

In the illustrated embodiment, the current sensor 48 is implemented as a resistor 50. Those skilled in the art refer to this resistor 50 as a "current sense resistor". The voltage across the resistor 50 is communicated to the controller 28. The controller then computes the current flowing through the resistor 50, and thus generally the current flowing through the inductor 38.

In the illustrated embodiments, the charging circuit 30 also includes a charging diode 52. The charging diode 52 has an anode (not numbered) electrically connected to the second side 42 of the inductor 38 and a cathode (not numbered) electrically connected to the positive bus 14. The charging diode 52 allows current to flow from the inductor 38 to the positive bus 14, but generally prevents current from flowing from the positive bus 14 to the inductor 38. The charging diode 52 is preferably implemented as a Zener diode; however, other types of diodes may also be suitable. Also in the illustrated embodiments, the charging circuit 30 includes a capacitor 54 electrically connected between the positive bus 14 and the negative bus 16.

The system 10 may also include a positive bus transfer switch 56 and a negative bus transfer switch 58. The positive bus transfer switch 56 is electrically connected to the positive bus 14 and the negative bus transfer switch 58 is electrically connected to the negative bus 16. These transfer switches 56, 58 may be utilized to electrically connect the busses 14, 16 to an external bank of cells (not shown). Therefore, the cells 12 may be used to charge other, external cells. The transfer switches 56, 58 may also be utilized to transfer energy, i.e., electric current, to an external system (not shown). The transfer switches 56, 68 may further be utilized to gather energy from an external system (not shown).

The method 100 of the subject invention may utilize the system 10 described above. However, those skilled in the art realize alternative techniques for implementing the method 100. Therefore, the method 100 described herein should not be read as limited only to use with the system 10 described herein.

The method 100 includes the step 102 of identifying an undercharged cell 12 from the plurality of cells 12 to charge. That is, determining which of the cells 12 is most in need of charging. Those skilled in the art comprehend multiple techniques for performing this step. One technique includes the utilization of voltage detection circuits (not shown) which are electrically connected to each cell 12. These voltage detection circuits determine a voltage of each cell 12 and are in communication with the controller.

Once it is determined which of the cells 12 is to be charged, the method continues with the step of 104 of electrically connecting a positive side of the undercharged cell 12 to the positive bus 14. This step 104 may be achieved by closing the positive bus switch 18 electrically connected to the positive side of the undercharged cell 12 such that current may flow from the positive bus 14 to the undercharged cell 12.

The method also includes the step 106 of electrically connecting a negative side of the undercharged cell 12 to the negative bus 16. Again, this step 106 may be achieved by closing the negative bus switch 20 electrically connected to the negative side of the undercharged cell 12.

The method further includes the step 108 of electrically connecting the inductor 38 to the voltage source 32 during a first time period. As such, the inductor 38 receives electric current from the voltage source 32. Specifically, current flows from the first side 40 to the second side 42 of the inductor 38. This step 108 is accomplished by closing the first and second switches 44, 46 to allow current to flow through them, i.e., activating the MOSFETs.

The method also includes the step 110 of electrically disconnecting the inductor 38 from the voltage source 32 in response to an elapse of the first time period. This is accomplished by opening the first and second switches 44, 46, i.e., deactivating the MOSFETs, thus preventing current from flowing.

The first time period is determined by the amount of current flowing through the charging circuit 30 in general and the inductor 38 in particular. Said another way, the first and second switches 44, 46 permit the flow of current until the current reaches a predetermined level. The predetermined level corresponds to the desired rate of current flow to charge the undercharged cell 12. To determine the amount of current flowing through the inductor, the method 100 also includes the step 112 of sensing the current flowing through the inductor 38. In the illustrated embodiment, this step 112 is implemented with the current sensor 48 disposed between the second switch 46 and the second terminal 36 of the voltage source 32.

The method 100 further includes the step 114 of maintaining the disconnection of the inductor 38 from the plurality of cells 12 for a second time period. The second time period corresponds generally to the time for the inductor 38 to discharge energy to the undercharged cell 12. Preferably, the second time period may be adjusted based on the voltage of the undercharged cell 12 in comparison to the other cells 12.

The steps 104, 106, 108, 110, 112, 114 of electrically connecting the inductor 38, sensing the current, electrically disconnecting the inductor 38, and maintaining the disconnection in response to the undercharged cell 12 remaining undercharged with respect to the plurality of cells 12 are repeated as necessary to fully charge the undercharged cell 12. The first and second time periods may be varied based on the changing charge of the undercharged cell 12. As such, a pulse-width modulation (PWM), based on the charged of the undercharged cell 12, is performed by the charging circuit 30.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A system for balancing a state of charge (SOC) of a plurality of cells connected in series, said system comprising:
   a positive bus and a negative bus;
   a plurality of positive bus switches with each positive bus switch electrically connected to said positive bus and to one of the cells for electrically connecting said positive bus to a positive side of the one of the cells;
   a plurality of negative bus switches with each negative bus switch electrically connected to said negative bus and to one of said cells for electrically connecting said negative bus to a negative side of the one of said cells;
   a charging circuit electrically connected to a voltage source and said busses for charging an undercharged cell of the plurality of cells;
   said charging circuit including
   an inductor having a first side electrically connected to said negative bus and a second side electrically connected to said positive bus,
   a first switch electrically connected to said first side of said inductor and a positive terminal of a voltage source, and
   a second switch electrically connected to said second side of said inductor and a negative terminal of the voltage source; and a controller in communication with said first and second switches for activating said first and second switches to transfer energy from the voltage source to said inductor and deactivating said first and second switches to transfer energy from said inductor to the undercharged cell of the plurality of cells.

2. A system as set forth in claim 1 further comprising a current sensor electrically connected between said second switch and the negative side of the voltage source and in communication with said controller for sensing an amount of current flowing through said inductor.

3. A system as set forth in claim 1 wherein said charging circuit further includes a charging diode having an anode electrically connected to said second side of said inductor a cathode electrically connected to said positive bus.

4. A system as set forth in claim 3 wherein said charging circuit further includes a capacitor electrically connected between said positive bus and said negative bus.

5. A system as set forth in claim 1 wherein said first switch is further defined as a first MOSFET having a gate electrically connected to said controller, a source electrically connected to a positive side of said voltage source, and a drain electrically connected to said first side of said inductor.

6. A system as set forth in claim 1 wherein said second switch is further defined as a second MOSFET having a gate electrically connected to said controller, a source electrically connected to a said second side of said inductor, and a drain electrically connected to said negative side of said voltage source.

7. A system as set forth in claim 1 further comprising a plurality of positive bus diodes wherein each positive bus diode is electrically connected between said positive bus and one of the cells for preventing current from flowing from the one of the cells to said positive bus.

8. A system as set forth in claim 1 further comprising a plurality of negative bus diodes wherein each negative bus diode is electrically connected between said negative bus and one of the cells for preventing current from flowing from said negative bus to the one of the cells.

9. A system as set forth in claim 1 further comprising a positive bus transfer switch electrically connected to said positive bus and a negative bus transfer switch electrically connected to said negative bus for electrically connecting said busses to an external bank of cells and/or an external system.

10. A system for balancing a state of charge (SOC) of a plurality of cells connected in series, said system comprising:
   a positive bus and a negative bus;
   a plurality of positive bus switches with each positive bus switch electrically connected to said positive bus and to one of the cells for electrically connecting said positive bus to a positive side of the one of the cells;
   a plurality of negative bus switches with each negative bus switch electrically connected to said negative bus and to one of said cells for electrically connecting said negative bus to a negative side of the one of said cells;
   a charging circuit electrically connected to a voltage source and said busses for charging an undercharged cell of the plurality of cells;
   said charging circuit including
   an inductor having a first side electrically connected to said negative bus and a second side electrically connected to said positive bus,
   a first switch electrically connected to said first side of said inductor and a positive terminal of a voltage source, and
   a second switch electrically connected to said second side of said inductor and a negative terminal of the voltage source;
   a controller in communication with said first and second switches for activating said first and second switches to transfer energy from the voltage source to said inductor and deactivating said first and second switches to transfer energy from said inductor to the undercharged cell of the plurality of cells; and
   a current sensor electrically connected between said second switch and the negative side of the voltage source and in communication with said controller for sensing an amount of current flowing through said inductor.

11. A system as set forth in claim 10 wherein said charging circuit further includes a charging diode having an anode electrically connected to said second side of said inductor a cathode electrically connected to said positive bus.

12. A system as set forth in claim 11 wherein said charging circuit further includes a capacitor electrically connected between said positive bus and said negative bus.

13. A system as set forth in claim 10 wherein said first switch is further defined as a first MOSFET having a gate electrically connected to said controller, a source electrically connected to a positive side of said voltage source, and a drain electrically connected to said first side of said inductor.

14. A system as set forth in claim 10 wherein said second switch is further defined as a second MOSFET having a gate electrically connected to said controller, a source electrically connected to a said second side of said inductor, and a drain electrically connected to said negative side of said voltage source.

15. A system as set forth in claim 10 further comprising a plurality of positive bus diodes wherein each positive bus diode is electrically connected between said positive bus and one of the cells for preventing current from flowing from the one of the cells to said positive bus.

16. A system as set forth in claim 10 further comprising a plurality of negative bus diodes wherein each negative bus diode is electrically connected between said negative bus and one of the cells for preventing current from flowing from said negative bus to the one of the cells.

17. A system as set forth in claim 10 further comprising a positive bus transfer switch electrically connected to said positive bus and a negative bus transfer switch electrically connected to said negative bus for electrically connecting said busses to an external bank of cells and/or an external system.

18. A system for balancing a state of charge (SOC) of a plurality of cells connected in series, said system comprising:
   a positive bus and a negative bus;
   a plurality of positive bus switches with each positive bus switch electrically connected to said positive bus and to one of the cells for electrically connecting said positive bus to a positive side of the one of the cells;
   a plurality of negative bus switches with each negative bus switch electrically connected to said negative bus and to one of said cells for electrically connecting said negative bus to a negative side of the one of said cells;
   a charging circuit electrically connected to a voltage source and said busses for charging an undercharged cell of the plurality of cells;
   said charging circuit including
   an inductor having a first side electrically connected to said negative bus and a second side electrically connected to said positive bus,
   a first switch electrically connected to said first side of said inductor and a positive terminal of a voltage source, and
   a second switch electrically connected to said second side of said inductor and a negative terminal of the voltage source;

a controller in communication with said first and second switches for activating said first and second switches to transfer energy from the voltage source to said inductor and deactivating said first and second switches to transfer energy from said inductor to the undercharged cell of the plurality of cells; and a plurality of positive bus diodes wherein each positive bus diode is electrically connected between said positive bus and one of the cells for preventing current from flowing from the one of the cells to said positive bus.

19. A system as set forth in claim 18 further comprising a plurality of negative bus diodes wherein each negative bus diode is electrically connected between said negative bus and one of the cells for preventing current from flowing from said negative bus to the one of the cells.

20. A system as set forth in claim 18 further comprising a positive bus transfer switch electrically connected to said positive bus and a negative bus transfer switch electrically connected to said negative bus for electrically connecting said busses to an external bank of cells and/or an external system.

* * * * *